(12) United States Patent
Kim et al.

(10) Patent No.: US 11,993,731 B2
(45) Date of Patent: May 28, 2024

(54) ADHESIVE COMPOSITION FOR SEMICONDUCTOR CIRCUIT CONNECTION AND ADHESIVE FILM CONTAINING THE SAME

(71) Applicant: LG CHEM, LTD., Seoul (KR)

(72) Inventors: Junghak Kim, Daejeon (KR); You Jin Kyung, Daejeon (KR); Kwang Joo Lee, Daejeon (KR); Minsu Jeong, Daejeon (KR); Ju Hyeon Kim, Daejeon (KR); Youngsam Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 84 days.

(21) Appl. No.: 17/266,023

(22) PCT Filed: Jun. 5, 2020

(86) PCT No.: PCT/KR2020/007338
§ 371 (c)(1),
(2) Date: Feb. 4, 2021

(87) PCT Pub. No.: WO2020/251219
PCT Pub. Date: Dec. 17, 2020

(65) Prior Publication Data
US 2021/0292616 A1    Sep. 23, 2021

(30) Foreign Application Priority Data

Jun. 10, 2019  (KR) .................. 10-2019-0068110
Jun. 4, 2020   (KR) .................. 10-2020-0067603

(51) Int. Cl.
*C09J 163/00*    (2006.01)
*C08G 59/30*     (2006.01)
(Continued)

(52) U.S. Cl.
CPC ............. *C09J 163/00* (2013.01); *C09J 11/04* (2013.01); *C09J 11/06* (2013.01); *C09J 183/06* (2013.01); *C09J 2203/326* (2013.01)

(58) Field of Classification Search
None
See application file for complete search history.

(56) References Cited

U.S. PATENT DOCUMENTS

| 2009/0162650 A1* | 6/2009 | Hong ................. C09D 163/00 428/416 |
| 2012/0168814 A1* | 7/2012 | Namiki ............... C09J 163/00 523/400 |

(Continued)

FOREIGN PATENT DOCUMENTS

| CN | 103178033 A | 6/2013 |
| CN | 106029747 A | 10/2016 |

(Continued)

OTHER PUBLICATIONS

International Search Report issued for International Application No. PCT/KR2020/007338 dated Sep. 17, 2020, 4 pages.

(Continued)

*Primary Examiner* — Randy P Gulakowski
*Assistant Examiner* — Ha S Nguyen
(74) *Attorney, Agent, or Firm* — ROTHWELL, FIGG, ERNST & MANBECK, P.C

(57) ABSTRACT

The present disclosure relates to an adhesive composition for semiconductor circuit connection and an adhesive film containing the same. The adhesive composition for semiconductor circuit connection according to the present disclosure can exhibit excellent adhesive strength during thermal compression bonding of a semiconductor circuit, and minimize a warpage of wafer caused by stacking of semiconductor circuits.

8 Claims, 1 Drawing Sheet

(a)
| 2 |
| 1 |

(b)
| 3 |
| 2 |
| 1 |

(c)
| 3 |
| 2 |
| 4 |
| 1 |

(51) Int. Cl.

| | | |
|---|---|---|
| C08G 59/32 | (2006.01) | |
| C08G 77/14 | (2006.01) | |
| C08L 33/20 | (2006.01) | |
| C08L 63/00 | (2006.01) | |
| C08L 83/06 | (2006.01) | |
| C09J 7/00 | (2018.01) | |
| C09J 7/10 | (2018.01) | |
| C09J 7/30 | (2018.01) | |
| C09J 11/00 | (2006.01) | |
| C09J 11/04 | (2006.01) | |
| C09J 11/06 | (2006.01) | |
| C09J 133/20 | (2006.01) | |
| C09J 183/06 | (2006.01) | |
| C09J 183/12 | (2006.01) | |

(56) References Cited

U.S. PATENT DOCUMENTS

| | | | |
|---|---|---|---|
| 2013/0154095 A1 | 6/2013 | Yu et al. | |
| 2019/0043748 A1* | 2/2019 | Kim | ............ C09J 163/04 |

FOREIGN PATENT DOCUMENTS

| | | | |
|---|---|---|---|
| JP | 2007-277525 A | 10/2007 | |
| JP | 2008-179682 A | 8/2008 | |
| JP | 2009062459 A * | 3/2009 | |
| JP | 2013-077557 A | 4/2013 | |
| JP | 2017-132919 A | 8/2017 | |
| JP | 2017-145289 A | 8/2017 | |
| JP | 2017-193610 A | 10/2017 | |
| JP | 2018-145346 A | 9/2018 | |
| KR | 10-0962936 B1 | 6/2010 | |
| KR | 10-2010-0134293 A | 12/2010 | |
| KR | 2010137057 A * | 12/2010 | |
| KR | 10-1104224 B1 | 1/2012 | |
| KR | 10-2012-0060979 A | 6/2012 | |
| KR | 20120080050 A * | 7/2012 | |
| KR | 10-2013-0125224 A | 11/2013 | |
| KR | 2013131079 A * | 12/2013 | ............ C03B 37/01 |
| KR | 10-2014-0078146 A | 6/2014 | |
| KR | 10-2015-0031012 A | 3/2015 | |
| TW | 200940672 A | 10/2009 | |
| WO | WO-2018066851 A1 * | 4/2018 | ............ C08L 61/04 |
| WO | WO 201831300 A1 * | 7/2018 | |

OTHER PUBLICATIONS

Sung Soo Lee et al., "Functional Silsesquioxane Coating Materials", Polymer Science and Technology vol. 27, No. 4, Aug. 2016, pp. 287-296.

Onizuka, Epoxy Resin Hardener, Journal of Japanese Society of Adhesion, 2017, vol. 53, No. 4, p. 122-128, along with its English machine translation (14 pages).

* cited by examiner (a) 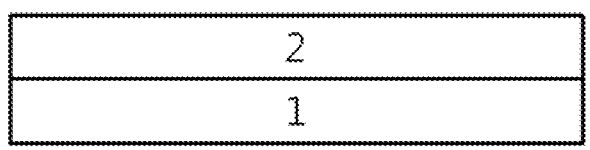
(b) 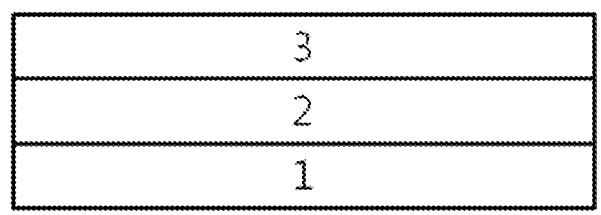
(c) 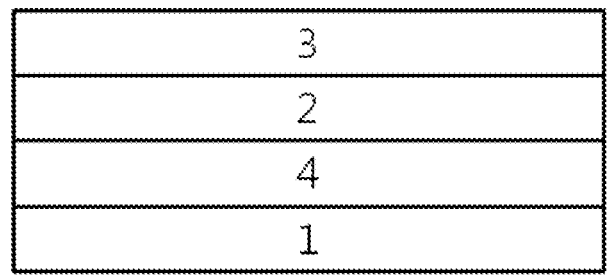

ADHESIVE COMPOSITION FOR SEMICONDUCTOR CIRCUIT CONNECTION AND ADHESIVE FILM CONTAINING THE SAME

TECHNICAL FIELD

Cross-Reference to Related Application

This application is a 35 U.S.C. 371 National Phase Entry Application from PCT/KR2020/007338, filed on Jun. 5, 2020, designating the United States, which claims the benefit of Korean Patent Application No. 10-2019-0068110 filed on Jun. 10, 2019 and Korean Patent Application No. 10-2020-0067603 filed on Jun. 4, 2020 with the Korean Intellectual Property Office, the disclosures of which are herein incorporated by reference in their entirety.

The present disclosure relates to an adhesive composition for semiconductor circuit connection and an adhesive film containing the same.

BACKGROUND OF THE INVENTION

As the need for densification and high integration of a semiconductor package has rapidly increased, the size of semiconductor chips becomes larger and larger. In terms of improvement in integration degree, a stack package method in which chips are stacked in multiple stages is increasingly used.

Thermal compression bonding is mainly used for bonding semiconductor chips. In the thermal compression bonding, the thermal curing property of the adhesive for semiconductor circuit connection affects a warpage phenomenon of the semiconductor wafer.

That is, the thermal curing property of the adhesive for semiconductor circuit connection affects reliability of a semiconductor stack package and productivity of the manufacturing process. For example, the more the chips are stacked on a semiconductor wafer, the more the warpage phenomenon of the wafer increases. Therefore, it is difficult to proceed a continuous process of manufacturing the semiconductor package, and the possibility of wafer cracking during the process increases.

BRIEF SUMMARY OF THE INVENTION

The present disclosure is to provide an adhesive composition for semiconductor circuit connection, which can exhibit excellent adhesive strength during thermal compression bonding of a semiconductor circuit, and minimize a warpage of wafer caused by stacking of semiconductor circuits.

In addition, the present disclosure is to provide an adhesive film containing the adhesive composition for semiconductor circuit connection.

According to one embodiment of the present disclosure, there is provided an adhesive composition for semiconductor circuit connection, including a thermosetting resin containing an organic epoxy resin and an organic-inorganic hybrid epoxy resin having a repeating unit represented by the following Chemical Formula 1 in a weight ratio of 1:0.03 to 1:4.0:

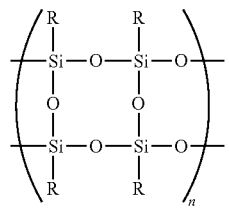

[Chemical Formula 1]

in Chemical Formula 1,

R is each independently a monovalent functional group having at least one epoxy group, and n is 1 to 30.

The R of Chemical Formula 1 may each independently be a functional group selected from the group consisting of the following structural formulae:

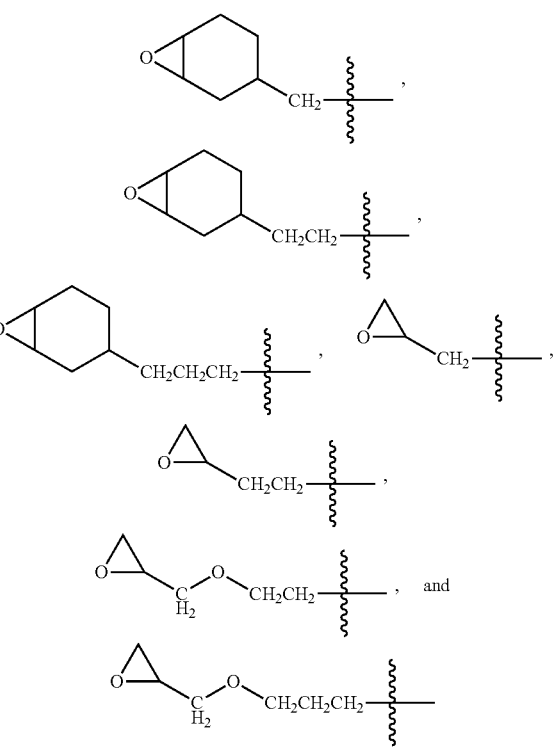

in the above structural formulae,

represents a site where the corresponding functional group is connected to Si.

The organic-inorganic hybrid epoxy resin may have an average epoxy equivalent weight of 50 g/eq. to 300 g/eq.

The organic-inorganic hybrid epoxy resin may have a viscosity of 0.1 Pa·s to 10000 Pa·s measured at 25° C.

The organic epoxy resin may be at least one resin selected from the group consisting of a bisphenol-based epoxy resin, a biphenyl-based epoxy resin, a naphthalene-based epoxy resin, a fluorene-based epoxy resin, a phenol novolac-based epoxy resin, a cresol novolac-based epoxy resin, a xylok-based epoxy resin, a trishydroxyphenylmethane-based epoxy resin, a tetraphenylmethane-based epoxy resin, a dicyclopentadiene-type epoxy resin, and a dicyclopentadiene-modified phenol-type epoxy resin.

The thermosetting resin may contain (a1) an organic epoxy resin which is solid at 10 to 35° C., (a2) an organic epoxy resin which is liquid at 10 to 35° C., and (a3) the organic-inorganic hybrid epoxy resin, a weight ratio of (a1):[(a2)+(a3)] may be 1:0.15 to 1:5.0, and a weight ratio of (a2):(a3) may be 1:0.15 to 1:10.

The adhesive composition for semiconductor circuit connection may further include a thermoplastic resin, a curing agent, an inorganic filler, and a curing catalyst.

The adhesive composition for semiconductor circuit connection may include 5 parts by weight to 350 parts by weight of the thermoplastic resin, 10 parts by weight to 150 parts by weight of the curing agent, 5 parts by weight to 200 parts by weight of the inorganic filler, and 0.1 to 20 parts by weight of the curing catalyst, based on 100 parts by weight of the thermosetting resin.

According to another embodiment of the present disclosure, there is provided an adhesive film containing the adhesive composition for semiconductor circuit connection.

Advantageous Effects

The adhesive composition for semiconductor circuit connection according to the present disclosure can exhibit excellent adhesive strength during thermal compression bonding of a semiconductor circuit, and minimize a warpage of wafer caused by stacking of semiconductor circuits.

BRIEF DESCRIPTION OF THE DRAWINGS

FIG. 1 is a cross-sectional view showing a laminated structure of an adhesive film for semiconductor circuit connection according to embodiments of the present disclosure.

DESCRIPTION OF SYMBOLS

1: supporting substrate, 2: adhesive layer, 3: protective film, 4: tacky layer

DETAILED DESCRIPTION OF THE INVENTION

Hereinafter, the adhesive composition for semiconductor circuit connection and the adhesive film containing the same according to the exemplary embodiments of the present disclosure will be described in more detail.

The terms are used merely to refer to specific embodiments, and are not intended to restrict the present disclosure unless it is explicitly expressed.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

I. The Adhesive Composition for Semiconductor Circuit Connection

According to one embodiment of the present disclosure, there is provided an adhesive composition for semiconductor circuit connection, including a thermosetting resin containing an organic epoxy resin and an organic-inorganic hybrid epoxy resin having a repeating unit represented by the following Chemical Formula 1 in a weight ratio of 1:0.03 to 1:4.0:

[Chemical Formula 1]

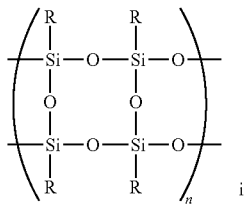

in Chemical Formula 1,

R is each independently a monovalent functional group having at least one epoxy group, and n is 1 to 30.

As a result of continuous research by the present inventors, it has been confirmed that the adhesive composition containing the thermosetting resin with the above-described configuration can minimize a warpage of wafer caused by stacking of semiconductor circuits, while exhibiting excellent adhesive strength during thermal compression bonding of the semiconductor circuit.

(A) The Thermosetting Resin

The adhesive composition for semiconductor circuit connection may include a mixture containing an organic epoxy resin and an organic-inorganic hybrid epoxy resin having a repeating unit represented by the Chemical Formula 1 in a weight ratio of 1:0.03 to 1:4.0 as the thermosetting resin.

The organic epoxy resin is an organic epoxy resin well known in the art, and its type is not particularly limited.

For example, the organic epoxy resin may be at least one resin selected from the group consisting of a bisphenol-based epoxy resin, a biphenyl-based epoxy resin, a naphthalene-based epoxy resin, a fluorene-based epoxy resin, a phenol novolac-based epoxy resin, a cresol novolac-based epoxy resin, a xylok-based epoxy resin, a trishydroxyphenylmethane-based epoxy resin, a tetraphenylmethane-based epoxy resin, a dicyclopentadiene-type epoxy resin, and a dicyclopentadiene-modified phenol-type epoxy resin.

Examples of the bisphenol-based epoxy resin may include a bisphenol A type epoxy resin, a bisphenol F type epoxy resin, a bisphenol S type epoxy resin, a hydrogenated bisphenol A type epoxy resin, and a bisphenol AF type epoxy resin.

The organic epoxy resin may have an average epoxy equivalent weight of 100 g/eq. to 1,000 g/eq. The average epoxy equivalent weight can be calculated based on the weight ratio of each epoxy resin contained in the organic epoxy resin and the epoxy equivalent weight.

Meanwhile, the organic-inorganic hybrid epoxy resin is a compound having a repeating unit represented by the following Chemical Formula 1:

[Chemical Formula 1]

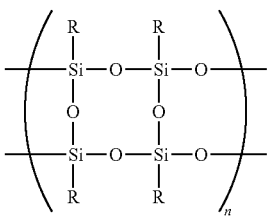

in Chemical Formula 1,
R is each independently a monovalent functional group having at least one epoxy group, and
n is 1 to 30.

Preferably, $R^1$ of Chemical Formula 1 may each independently be a functional group selected from the group consisting of the following structural formulae:

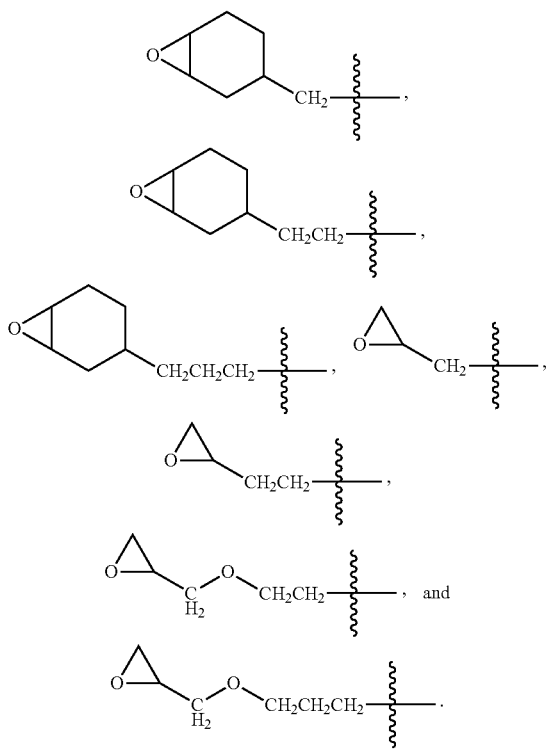

In the above structural formulae,

represents a site where the corresponding functional group is connected to another group.

The organic-inorganic hybrid epoxy resin may have an average epoxy equivalent weight of 50 g/eq. to 300 g/eq. The average epoxy equivalent weight can be calculated based on the weight ratio of each epoxy resin contained in the organic-inorganic hybrid epoxy resin and the epoxy equivalent weight.

Preferably, the organic-inorganic hybrid epoxy resin may have an average epoxy equivalent weight of 50 g/eq. to 300 g/eq., 100 g/eq. to 300 g/eq., 100 g/eq. to 250 g/eq., 150 g/eq. to 250 g/eq., 150 g/eq. to 200 g/eq., or 160 g/eq. to 180 g/eq.

In order to enable the addition effect of the organic-inorganic hybrid epoxy resin to be expressed, it is preferable that the organic-inorganic hybrid epoxy resin has an average epoxy equivalent weight of 50 g/eq. or more. However, too high epoxy equivalent weight may degrade physical properties of the adhesive composition for semiconductor circuit connection. Therefore, it is preferable that the organic-inorganic hybrid epoxy resin has an average epoxy equivalent weight of 300 g/eq. or less.

It is preferable that the organic-inorganic hybrid epoxy resin has a viscosity measured at 25° C. of 0.1 Pa·s to 10000 Pa·s, or 0.5 Pa·s or 5000 Pa·s.

When the viscosity of the organic-inorganic hybrid epoxy resin is too high, physical properties of the adhesive composition for semiconductor circuit connection and physical properties of the adhesive film may be deteriorated. Therefore, it is preferable that the organic-inorganic hybrid epoxy resin has a viscosity of 10000 Pa·s or less.

The thermosetting resin preferably contains the organic epoxy resin and the organic-inorganic hybrid epoxy resin in a weight ratio of 1:0.03 to 1:4.0, 1:0.03 to 1:3.0, or 1:0.03 to 1:2.5.

In order to enable the addition effect of the organic-inorganic hybrid epoxy resin to be expressed, it is preferable that the organic epoxy resin and the organic-inorganic hybrid epoxy resin are contained in a weight ratio of 1:0.03 or more. When the organic-inorganic hybrid epoxy resin is added in an excessively small amount, a warpage of wafer may occur.

However, when the organic-inorganic hybrid epoxy resin is added in an excessive amount, many fillets may be generated when manufacturing a semiconductor device. Thus, it is preferable that the organic epoxy resin and the organic-inorganic hybrid epoxy resin are contained in a weight ratio of 1:4.0 or less, 1:3.0 or less, or 1:2.5 or less.

Preferably, the adhesive composition for semiconductor circuit connection may contain an organic epoxy resin which is solid at 10 to 35° C., and an organic epoxy resin which is liquid at 10 to 35° C. as the organic epoxy resin.

That is, it its preferable that the thermosetting resin contains (a1) an organic epoxy resin which is solid at 10 to 35° C., (a2) an organic epoxy resin which is liquid at 10 to 35° C., and (a3) the organic-inorganic hybrid epoxy resin.

In particular, it is preferable that the thermosetting resin contains the organic epoxy resin and the organic-inorganic hybrid epoxy resin in a weight ratio of 1:0.03 to 1:4.0 ([(a1)+(a2)]:(a3)), and at the same time, a weight ratio of (a1):[(a2)+(a3)] is 1:0.15 to 1:5.0, and a weight ratio of (a2):(a3) is 1:0.15 to 1:10.

Preferably, the weight ratio of (a1):[(a2)+(a3)] is 1:0.15 to 1:5.0, 1:0.2 to 1:5.0, 1:0.2 to 1:4.5, or 1:0.2 to 1:4.0 in the thermosetting resin.

When the weight ratio of [(a2)+(a3)] is too low compared to (a1), reliability of conduction of the adhesive composition is lowered, and void defects and poor connection may occur. When the weight ratio of [(a2)+(a3)] is too high compared to (a1), fillet property and thermal cycle property of the adhesive composition may be poor.

Preferably, the weight ratio of (a2):(a3) in the thermosetting resin is 1:0.15 to 1:10, 1:0.15 to 1:9.0, 1:0.15 to 1:8.0, or 1:0.15 to 1:7.0.

When (a3) the organic-inorganic hybrid epoxy is added in an excessively small amount compared to (a2) the organic liquid epoxy, a warpage of wafer may occur. However, when (a3) the organic-inorganic hybrid epoxy is added in an excessive amount compared to (a2) the organic liquid epoxy, fillet property of the adhesive composition may become poor, and void defects and poor connection may occur.

In addition, the weight ratio of (a1):(a2) in the thermosetting resin is 1:0.1 to 1:5.0, 1:0.15 to 1:4.0, or 1:0.15 to 1:3.0.

When the weight ratio of (a1) the organic solid epoxy resin is less than 0.1 with respect to (a2) the organic liquid epoxy resin, the resin may excessively flow out during die attach process to cause contamination, and stickiness of the adhesive layer may become strong and thus pick-up properties may be significantly deteriorated. However, when the weight ratio of (a1) the organic solid epoxy resin is more than 5.0 with respect to (a2) the organic liquid epoxy resin, compatibility and reactivity with the thermoplastic resin may not be good.

In addition, the organic epoxy resin may further include at least one epoxy resin selected from the group consisting of a cresol novolac-type epoxy resin having a softening point of 50° C. to 100° C. and a bisphenol A epoxy resin having a softening point of 50° C. to 100° C. together with a biphenyl-based epoxy resin having a softening point of 50° C. to 100° C.

Herein, the epoxy resin may include at least one epoxy resin selected from the group consisting of a cresol novolac-type epoxy resin having a softening point of 50° C. to 100° C. and a bisphenol A epoxy resin having a softening point of 50° C. to 100° C. in a weight ratio of 1:0.25 to 1:1.25, or 1:0.3 to 1:1.1, based on the biphenyl-based epoxy resin having a softening point of 50° C. to 100° C.

According to one embodiment of the present disclosure, the adhesive composition for semiconductor circuit connection may further include (B) a thermoplastic resin, (C) a curing agent, (D) an inorganic filler, and (E) a curing catalyst in addition to (A) the thermosetting resin.

(B) The Thermoplastic Resin

The adhesive composition for semiconductor circuit connection may include at least one resin selected from the group consisting of (meth)acrylate-based resin, polyimide, polyether imide, polyester imide, polyamide, polyether sulfone, polyether ketone, polyvinyl chloride, polybutadiene resin, acrylonitrile-butadiene copolymer, acrylonitrile-butadiene-styrene resin, styrene-butadiene copolymer, and phenoxy resin as the thermoplastic resin.

Preferably, a (meth)acrylate-based resin having a glass transition temperature of −10° C. to 30° C. and a weight average molecular weight of 50,000 g/mol to 1,200,000 g/mol may be applied as the thermoplastic resin.

For example, the weight average molecular weight can be measured using Agilent PL-GPC 220 equipped with a 300 mm long PolarGel MIXED-L column (manufactured by Polymer Laboratories). The measurement temperature is 65° C., dimethylformamide is used as a solvent, and a flow rate is 1 mL/min. The sample with a concentration of 10 mg/10 mL is supplied in an amount of 100 μL. Mw and Mn are obtained using a calibration curve formed using a polystyrene standard. 8 kinds of the polystyrene standard are used with the molecular weight (g/mol) of 580/3,940/8,450/31,400/70,950/316,500/956,000/4,230,000.

Preferably, the thermoplastic resin may be a (meth)acrylate-based resin having a (meth)acrylate-based repeating unit containing an epoxy-based functional group. For example, the thermoplastic resin may be a (meth)acrylate-based resin that is a copolymer of alkyl (meth)acrylate, acrylonitrile, and glycidyl (meth)acrylate.

The (meth)acrylate-based resin is an acrylic copolymer containing an epoxy group, and may contain glycidyl acrylate or glycidyl methacrylate in an amount of 1 to 30 wt %, 2 to 20 wt % or 2.5 to 15 wt %.

Herein, when the epoxy group is included in an amount of less than 1 wt % in the (meth)acrylate-based resin, compatibility with the epoxy resin and adhesive strength may not be sufficient. When the amount exceeds 30 wt %, a rising rate of viscosity due to curing becomes too fast, so that bonding and filling of solder bumps may not be sufficiently performed in the thermal compression bonding process of semiconductor devices.

The content of the thermoplastic resin may be determined in consideration of flowability of the composition during the production of the adhesive film and physical properties of the final adhesive film. Preferably, (B) the thermoplastic resin is included in an amount of 5 to 350 parts by weight, 10 to 350 parts by weight, 20 to 200 parts by weight, 20 to 100 parts by weight, or 20 to 70 parts by weight based on 100 parts by weight of (A) the thermosetting resin.

(C) The Curing Agent

The adhesive composition for semiconductor circuit connection may include at least one compound selected from the group consisting of an amine-based curing agent, a phenol-based curing agent, and an acid anhydride-based curing agent as the curing agent.

As the curing agent, a novolac-based phenolic resin may be preferably applied.

The novolac-based phenolic resin has a chemical structure in which a ring is located between the reactive functional groups. Due to the structural characteristic, the novolac-based phenolic resin may further lower hygroscopicity of the adhesive composition and may further improve stability in an IR reflow process at a high temperature, thereby preventing peeling of the adhesive film and reflow cracking.

Specific examples of the novolac-based phenolic resin include at least one selected from the group consisting of a novolac phenolic resin, a xylok novolac phenolic resin, a cresol novolac phenolic resin, a biphenyl novolac phenolic resin, a bisphenol A novolac phenolic resin, and a bisphenol F novolac phenolic resin.

The novolac-based phenolic resin may have a softening point of 60° C. or higher, 60° C. to 150° C., 105° C. to 150° C., or 70° C. to 120° C.

The novolac-based phenolic resin having a softening point of 60° C. or higher ensures sufficient heat resistance, strength and adhesiveness after curing of the adhesive composition. However, when the softening point of the novolac-based phenolic resin is too high, flowability of the adhesive composition may be lowered and voids may be formed inside the adhesive in the actual semiconductor manufacturing process, thereby significantly lowering the reliability or quality of the final product.

The novolac-based phenolic resin may preferably have a hydroxyl equivalent weight of 80 g/eq to 300 g/eq and a softening point of 60° C. to 150° C.

The content of the curing agent may be appropriately selected in consideration of physical properties of the finally produced adhesive film. For example, (C) the curing agent may be used in an amount of 10 to 150 parts by weight, 20 to 100 parts by weight, 25 to 50 parts by weight, or 25 to 40 parts by weight based on 100 parts by weight of (A) the thermosetting resin.

(D) The Inorganic Filler

The adhesive composition for semiconductor circuit connection may include at least one inorganic particle selected from the group consisting of alumina, silica, barium sulfate, magnesium hydroxide, magnesium carbonate, magnesium silicate, magnesium oxide, calcium silicate, calcium carbonate, calcium oxide, aluminum hydroxide, aluminum nitride, and aluminum borate as the inorganic filler.

An ion adsorbent capable of adsorbing ionic impurities and improving reliability may be used as the inorganic filler. The ion adsorbent may be at least one inorganic particle selected from the group consisting of magnesium hydroxide, magnesium carbonate, magnesium silicate, magnesium oxide, calcium silicate, calcium carbonate, calcium oxide, alumina, aluminum hydroxide, aluminum nitride, aluminum borate whisker, a zirconium-based inorganic substance, and an antimony-bismuth-based inorganic substance.

The inorganic filler may preferably have an average particle diameter (based on the longest outer diameter) of 0.01 to 10 μm, 0.02 to 5.0 μm, or 0.03 to 2.0 μm. When the particle diameter of the inorganic filler is too small, it can be easily agglomerated in the adhesive composition. On the other hand, when the particle diameter of the inorganic filler is too large, the semiconductor circuit may be damaged by the inorganic filler and adhesion of the adhesive film may be deteriorated.

(D) The inorganic filler may be used in an amount of 5 to 200 parts by weight, 50 to 200 parts by weight, or 95 to 200 parts by weight based on 100 parts by weight of (A) the thermosetting resin.

(E) The Curing Catalyst

The adhesive composition for semiconductor circuit connection may include at least one compound selected from the group consisting of a phosphorus-based compound, a boron-based compound, a phosphorous-boron-based compound, and an imidazole-based compound as (E) the curing catalyst.

The curing catalyst functions for facilitating the action of the curing agent or the curing of the adhesive resin composition for bonding semiconductors, and any curing catalysts known to be used in the field of the adhesive film for semiconductors may be applied without particular limitations.

The content of the curing catalyst may be appropriately determined in consideration of the content of the curing agent and physical properties of the finally produced adhesive film. For example, (E) the curing catalyst may be used in an amount of 0.1 to 20 parts by weight, 0.5 to 15 parts by weight, 1.0 to 10 parts by weight, 1.5 to 5 parts by weight, or 1.5 to 3 parts by weight based on 100 parts by weight of (A) the thermosetting resin.

(F) The Organic Solvent

The adhesive composition for semiconductor circuit connection may further include an organic solvent.

The content of the organic solvent may be appropriately determined in consideration of physical properties of the adhesive composition and the adhesive film containing the same, and productivity of the manufacturing process.

For example, the organic solvent may be included in an amount of 10 to 90 parts by weight based on 100 parts by weight of a total of (A) a thermosetting resin, (B) a thermoplastic resin, (C) a curing agent, (D) an inorganic filler, and (E) a curing catalyst.

The organic solvent may be at least one compound selected from the group consisting of esters, ethers, ketones, aromatic hydrocarbons, and sulfoxides.

Examples of the ester solvent include ethyl acetate, n-butyl acetate, isobutyl acetate, amyl formate, isoamyl acetate, isobutyl acetate, butyl propionate, isopropyl butyrate, ethyl butyrate, butyl butyrate, methyl lactate, ethyl lactate, gamma-butyrolactone, epsilon-caprolactone, delta-valerolactone, alkyl oxyacetate such as methyl oxyacetate, ethyl oxyacetate, methyl methoxyacetate, ethyl methoxyacetate, butyl methoxyacetate, methyl ethoxyacetate, ethyl ethoxyacetate, methyl 3-oxypropionate, ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, ethyl 2-oxobutanoate and the like.

Examples of the ether solvent include diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether, propylene glycol monomethyl ether acetate, propylene glycol monoethyl ether acetate, propylene glycol monopropyl ether acetate and the like.

Examples of the ketone solvent include methyl ethyl ketone, cyclohexanone, cyclopentanone, 2-heptanone, 3-heptanone, N-methyl-2-pyrrolidone and the like.

Examples of the aromatic hydrocarbon solvent include toluene, xylene, anisole, limonene and the like.

Examples of the sulfoxide solvent include dimethyl sulfoxide and the like.

(G) The Coupling Agent

The adhesive composition for semiconductor circuit connection may further include a coupling agent.

The coupling agent is not particularly limited, but preferably 2-(3,4-epoxycyclohexyl)-ethyltrimethoxysilane, 3-glycidoxypropyltrimethoxysilane, 3-glycidoxypropylmethyl-diethoxysilane, 3-glycidoxypropyltriethoxysilane, N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, mercapto-containing 3-mercaptopropylmethyldimethoxysilane, 3-mercaptopropyltrimethoxysilane and the like.

(H) The Flux Agent

The adhesive composition for semiconductor circuit connection may further include a flux agent.

The flux agent is preferably at least one compound selected from carboxylic acids, phenols and alcohols.

The carboxylic acids may be aliphatic carboxylic acids or aromatic carboxylic acids.

Examples of the aliphatic carboxylic acid may include malonic acid, methylmalonic acid, dimethylmalonic acid, ethylmalonic acid, allylmalonic acid, 2,2'-thiodiacetic acid, 3.3'-thiodipropionic acid, 2,2'-(ethylenedithio)diacetic acid, 3,3'-dithiodipropionic acid, 2-ethyl-2-hydroxybutyric acid, dithiodiglycolic acid, diglycolic acid, acetylene dicarboxylic acid, maleic acid, malic acid, 2-isopropylmalic acid, tartaric acid, itaconic acid, 1,3-acetonedicarboxylic acid, tricarballylic acid, muconic acid, β-hydromuconic acid, succinic acid, methylsuccinic acid, dimethylsuccinic acid, glutaric acid, α-ketoglutaric acid, 2-methylglutaric acid, 3-methylglutaric acid, 2,2-dimethylglutaric acid, 3,3-dimethylglutaric acid, 2,2-bis(hydroxymethyl)propionic acid, citric acid, adipic acid, 3-tert-butyladipic acid, pimelic acid, phenyloxalic acid, phenylacetic acid, nitrophenylacetic acid, phenoxyacetic acid, nitrophenoxyacetic acid, phenylthioacetic acid, hydroxyphenylacetic acid, dihydroxyphenylacetic acid, mandelic acid, hydroxymandelic acid, dihydroxymandelic acid, 1,2,3,4-butanetetracarboxylic acid, suberic acid, 4,4'-dithiodibutyric acid, cinnamic acid, nitrocinnamic acid, hydroxycinnamic acid, dihydroxycinnamic acid, coumarinic acid, phenylpyruvic acid, hydroxyphenylpyruvic acid, caffeic acid, homophthalic acid, tolylacetic acid, phenoxypropionic acid, hydroxyphenylpropionic acid, benzyloxyacetic acid, phenyllactic acid, tropic acid, 3-(phenylsulfonyl)propionic acid, 3,3-tetramethyleneglutaric acid, 5-oxoazelaic acid, azelaic acid, phenylsuccinic acid, 1,2-phenylenediacetic acid, 1,3-phenylenediacetic acid, 1,4-phenylenediacetic acid, benzylmalonic acid, sebacic acid, dodecanedioic acid, undecanedioic acid, diphenylacetic acid, benzilic acid, dicyclohexylacetic acid, tetradecane diacid, 2,2-diphenylpropionic acid, 3,3-diphenylpropionic acid, 4,4-bis(4-hydroxyphenyl)valeric acid, pimaric acid, palustric acid, isopimaric acid, abietic acid, dehydroabietic acid, neoabietic acid, agathic acid and the like.

Examples of the aromatic carboxylic acid may include benzoic acid, 2-hydroxybenzoic acid, 3-hydroxybenzoic acid, 4-hydroxybenzoic acid, 2,3-dihydroxybenzoic acid, 2,4-dihydroxybenzoic acid, 2,5-dihydroxybenzoic acid, 2,6-dihydroxybenzoic acid, 3,4-dihydroxybenzoic acid, 2,3,4-trihydroxybenzoic acid, 2,4,6-trihydroxybenzoic acid, 3,4,5-trihydroxybenzoic acid, 1,2,3-benzenetricarboxylic acid, 1,2,4-benzenetricarboxylic acid, 1,3,5-benzenetricarboxylic acid, 2-[bis(4-hydroxyphenyl)methyl]benzoic acid, 1-naphthoic acid, 2-naphthoic acid, 1-hydroxy-2-naphthoic acid, 2-hydroxy-1-naphthoic acid, 3-hydroxy-2-naphthoic acid, 6-hydroxy-2-naphthoic acid, 1,4-dihydroxy-2-naphthoic acid, 3,5-dihydroxy-2-naphthoic acid, 3,7-dihydroxy-2-naphthoic acid, 2,3-naphthalenedicarboxylic acid, 2,6-naphthalenedicarboxylic acid, 2-phenoxybenzoic acid, biphenyl-4-carboxylic acid, biphenyl-2-carboxylic acid, 2-benzoylbenzoic acid and the like. Preferred among these, in terms of storage stability and availability, are succinic acid, malic acid, itaconic acid, 2,2-bis(hydroxymethyl)propionic acid, adipic acid, 3,3'-thiodipropionic acid, 3,3'-dithiodipropionic acid, 1,2,3,4-butanetetracarboxylic acid, suberic acid, sebacic acid, phenylsuccinic acid, dodecanedioic acid, diphenylacetic acid, benzilic acid, 4,4-bis(4-hydroxyphenyl)valeric acid, abietic acid, 2,5-dihydroxybenzoic acid, 3,4,5-trihydroxybenzoic acid, 1,2,4-benzenetricarboxylic acid, 1,3,5-benzenetricarboxylic acid, 2-[bis(4-hydroxyphenyl)methyl]benzoic acid, 1,2,4,5-benzenetetracarboxylic acid and the like.

These carboxylic acids may be used alone or in combinations of two or more.

The phenols may be a compound having at least two phenolic hydroxyl groups.

Examples of the phenol may include catechol, resorcinol, hydroquinone, biphenol, dihydroxynaphthalene, hydroxyhydroquinone, pyrogallol, methylidenebiphenol (bisphenol F), isopropylidenebiphenol (bisphenol A), ethylidenebiphenol (bisphenol AD), 1,1,1-tris(4-hydroxyphenyl)ethane, trihydroxybenzophenone, trihydroxyacetophenone, poly-p-vinylphenol and the like.

The compound having at least two phenolic hydroxyl groups may be polycondensates of one or more compounds selected from compounds having at least one phenolic hydroxyl group in the molecule; an aromatic compound having two halomethyl, alkoxymethyl or hydroxylmethyl groups in the molecule; and at least one compound selected from divinylbenzenes and aldehydes.

Examples of the compound having at least one phenolic hydroxyl group in the molecule may include phenol, alkylphenol, naphthol, cresol, catechol, resorcinol, hydroquinone, biphenol, dihydroxynaphthalene, hydroxyhydroquinone, pyrogallol, methylidenebiphenol (bisphenol F), isopropylidenebiphenol (bisphenol A), ethylidenebiphenol (bisphenol AD), 1,1,1-tris(4-hydroxyphenyl)ethane, trihydroxybenzophenone, trihydroxyacetophenone and poly-p-vinylphenol. Examples of the aromatic compound having two halomethyl, alkoxymethyl or hydroxylmethyl groups in the molecule may include 1,2-bis(chloromethyl)benzene, 1,3-bis(chloromethyl)benzene, 1,4-bis(chloromethyl)benzene, 1,2-bis(methoxymethyl)benzene, 1,3-bis(methoxymethyl)benzene, 1,4-bis(methoxymethyl)benzene, 1,2-bis(hydroxymethyl)benzene, 1,3-bis(hydroxymethyl)benzene, 1,4-bis(hydroxymethyl)benzene, bis(chloromethyl)biphenyl, bis(methoxymethyl)biphenyl and the like.

Examples of the aldehyde may include formaldehyde (or formalin in aqueous solution), paraformaldehyde, trioxane, hexamethylenetetramine and the like.

Examples of the polycondensates may include phenol-novolac resins, which are polycondensates of phenol and formaldehyde, cresol-novolac resins, which are polycondensates of cresol and formaldehyde, naphthol-novolac resins, which are polycondensates of naphthol and formaldehyde, phenolaralkyl resins, which are polycondensates of phenol and 1,4-bis(methoxymethyl)benzene, polycondensates of bisphenol A and formaldehyde, polycondensates of phenol and divinylbenzene and polycondensates of cresol, naphthol and formaldehyde. These polycondensates may be rubber-modified or may have an aminotriazine skeleton or dicyclopentadiene skeleton introduced into the molecular skeleton.

In addition, examples of a phenolic hydroxyl-containing compound that has been liquefied by allylation may include allylated phenol-novolac resins, diallylbisphenol A, diallylbisphenol F, diallylbiphenols and the like.

The alcohols may be a compound having at least two alcoholic hydroxyl groups in the molecule.

Examples of the alcohol may include 1,3-dioxane-5,5-dimethanol, 1,5-pentanediol, 2,5-furanedimethanol, diethylene glycol, tetraethylene glycol, pentaethylene glycol, hexaethylene glycol, 1,2,3-hexanetriol, 1,2,4-butanetriol, 1,2,6-hexanetriol, 3-methylpentane-1,3,5-triol, glycerin, trimethylolethane, trimethylolpropane, erythritol, pentaerythritol, ribitol, sorbitol, 2,4-diethyl-1,5-pentanediol, propyleneglycol monomethyl ether, propyleneglycol monoethyl ether, 1,3-butylene glycol, 2-ethyl-1,3-hexanediol, N-butyldiethanolamine, N-ethyldiethanolamine, diethanolamine, triethanolamine, N,N-bis(2-hydroxyethyl)isopropanolamine, bis(2-hydroxymethyl)iminotris(hydroxymethyl)methane, N,N,N',N'-tetrakis(2-hydroxyethyl)ethylenediamine, 1,1',1'',1'''-(ethylenedinitrilo)tetrakis(2-propanol) and the like.

Preferred are compounds with tertiary nitrogen atoms, such as N-butyldiethanolamine, N-ethyldiethanolamine, triethanolamine, N,N-bis(2-hydroxyethyl)isopropanolamine, bis(2-hydroxymethyl)iminotris(hydroxymethyl)methane, N,N,N',N'-tetrakis(2-hydroxyethyl)ethylenediamine and (ethylenedinitrilo)tetrakis(2-propanol), because they exhibit good flux activity compared to other compounds.

II. The Adhesive Film for Semiconductor Circuit Connection

According to another embodiment of the present disclosure, there is provided an adhesive film for semiconductor circuit connection containing the above-described adhesive composition.

Since the adhesive film for semiconductor circuit connection contains the adhesive composition for semiconductor circuit connection of the above-described embodiment, it is possible to minimize a warpage of wafer caused by stacking of semiconductor circuits while exhibiting excellent adhesive strength during thermal compression bonding of the semiconductor circuit.

FIG. 1 is a cross-sectional view showing a laminated structure of an adhesive film for semiconductor circuit connection according to embodiments of the present disclosure.

Referring to FIG. 1 (a), the adhesive film may have a laminated structure in which a supporting substrate (1) and an adhesive layer (2) are sequentially stacked.

Referring to FIG. 1 (b), the adhesive film may have a laminated structure in which a supporting substrate (1), an adhesive layer (2), and a protective film (3) are sequentially stacked.

Referring to FIG. 1 (c), the adhesive film may have a laminated structure in which a supporting substrate (1), a tacky layer (4), an adhesive layer (2), and a protective film (3) are sequentially stacked.

As the supporting substrate, a resin film excellent in heat resistance or chemical resistance; a cross-linked film obtained by cross-linking a resin constituting the resin film; or a film obtained by coating a silicone resin or the like on a surface of the resin film and peeling the film may be used.

Examples of the resin constituting the resin film may include polyolefins such as polyester, polyethylene, polypropylene, polybutene and polybutadiene, vinyl chloride, ethylene-methacrylic acid copolymer, ethylene-vinyl acetate copolymer, polyester, polyimide, polyethylene terephthalate, polyamide, polyurethane and the like.

A thickness of the supporting substrate is not particularly limited, but may be 3 to 400 μm, 5 to 200 μm, or 10 to 150 μm.

The adhesive layer is composed of the above-mentioned adhesive composition. The description of the adhesive composition is as described above.

Further, if necessary, the tacky layer may be interposed between the supporting substrate and the adhesive layer. As the tacky layer, those known in the art may be applied without particular limitation.

The kind of the protective film is not particularly limited, and a plastic film known in the art may be applied. For example, the protective film may be a plastic film including a resin such as low density polyethylene, linear polyethylene, medium density polyethylene, high density polyethylene, ultra low density polyethylene, random copolymer of polypropylene, block copolymer of polypropylene, homopolypropylene, polymethylpentene, ethylene-vinyl acetate copolymer, ethylene-methacrylic acid copolymer, ethylene-methyl methacrylate copolymer, ethylene-ionomer copolymer, ethylene-vinyl alcohol copolymer, polybutene and styrene.

The adhesive film for semiconductor circuit connection may be produced by mixing components of the adhesive composition, coating the same on a supporting substrate to a predetermined thickness to form an adhesive layer, and drying the adhesive layer.

The adhesive film may be produced by forming an adhesive layer on the supporting substrate and then laminating a protective film on the adhesive layer.

The adhesive film may be produced by forming a tacky layer on the supporting substrate, and then sequentially laminating an adhesive layer and a protective film on the tacky layer.

The adhesive layer may be formed on the supporting substrate by a method in which the adhesive composition is coated on the supporting substrate or on a release film directly or after diluted with an appropriate organic solvent by a known means such as a comma coater, a gravure coater, a die coater, a reverse coater, and the like, followed by drying at a temperature of 60° C. to 200° C. for 10 seconds to 30 minutes.

If necessary, an aging process may be further carried out so as to proceed sufficient cross-linking of the adhesive layer.

A thickness of the adhesive layer may be appropriately adjusted in the range of 1 to 500 μm, 5 to 100 μm, or 5 to 50 μm.

DETAILED DESCRIPTION OF THE EMBODIMENTS

Hereinafter, the present invention will be described in more detail with reference to examples. However, these examples are for illustrative purposes only, and the invention is not intended to be limited by these examples.

Preparation Example 1

(Preparation of Thermoplastic Acrylate Resin)

40 g of butyl acrylate, 30 g of ethyl acrylate, 30 g of acrylonitrile, and 5 g of glycidyl methacrylate were mixed with 100 g of toluene, and reacted at 80° C. for about 12 hours to synthesize an acrylate-based resin (weight average molecular weight of 100,000 g/mol, glass transition temperature of 15° C.) having glycidyl groups introduced into branched chains.

Preparation Example 2

(Preparation of Thermoplastic Acrylate Resin)

40 g of butyl acrylate, 30 g of ethyl acrylate, 30 g of acrylonitrile, and 10 g of glycidyl methacrylate were mixed with 100 g of toluene, and reacted at 80° C. for about 12 hours to synthesize an acrylate-based resin (weight average molecular weight of 500,000 g/mol, glass transition temperature of 17° C.) having glycidyl groups introduced into branched chains.

Example 1

(1) Preparation of Adhesive Composition for Semiconductor Circuit Connection 30 g of a phenolic resin (GPH-65, manufactured by Nippon Kayaku, hydroxyl equivalent weight of 198 g/eq, softening point of 65° C.) as a curing agent of an epoxy resin; 15 g of organic liquid epoxy (KDS-8170, manufactured by Kukdo Chemical, bisphenol F epoxy resin, epoxy equivalent weight of 157 g/eq); 50 g of organic solid epoxy (EPPN-201L, manufactured by Nippon Kayaku, epoxy equivalent weight of 190 g/eq); 10 g of organic-inorganic hybrid epoxy (EP0408, epoxy equivalent weight of 177 g/eq, epoxycyclohexyl POSS, hybrid plastics); 50 g of a thermoplastic acrylate resin obtained in Preparation Example 1; 95 g of an inorganic filler (YA050C, manufactured by Admatech, spherical silica, average particle diameter of about 50 nm); and 2 g of an imidazole curing agent (C11Z-CNS, manufactured by Curezol, SHIKOKU) were mixed with methyl ethyl ketone to obtain an adhesive composition for semiconductor circuit connection (solids content of 50 wt %).

(2) Preparation of Adhesive Film

The adhesive composition was coated on a release-treated polyethylene terephthalate film (thickness of 38 μm) using a comma coater and dried at 110° C. for 3 minutes to obtain an adhesive film in which an adhesive layer having a thickness of about 20 μm is formed.

(3) Preparation of Semiconductor Device

A wafer including a bump chip (10.1 mm×6.6 mm) as a semiconductor element in which a lead-free solder is formed at a height of 9 μm on a copper filler having a height of 10 μm and a pitch of 40 μm was prepared.

After the adhesive layer of the adhesive film was positioned on a bump surface of the wafer, vacuum lamination was carried out at 50° C. and individualized by each chip.

The individualized bump chip was subjected to a thermal compression bonding on a 12.1 mm×8.1 mm substrate chip having a 40 μm pitch connection pad using a thermal compression bonder. Specifically, it was pre-bonded at 100 N for 2 seconds at a head temperature of 120° C., heated to a head temperature of 260° C. for an instant, and subjected to a thermal compression bonding at 200N for 5 seconds.

Examples 2 to 12 and Comparative Examples 1 to 5

Each adhesive composition for semiconductor circuit connection was prepared in the same manner as in Example 1, except that the components and the contents shown in Tables 1 to 3 were applied.

Thereafter, an adhesive film was prepared in the same manner as in Example 1 using the adhesive composition, and a semiconductor device was manufactured using the adhesive film.

TABLE 1

| | Weight (g) | Example 1 | Example 2 | Example 3 | Example 4 | Example 5 | Example 6 |
|---|---|---|---|---|---|---|---|
| (a1) | EPPN-201L | 50 | — | — | — | 50 | — |
| | NC-2000L | — | 50 | — | — | — | 25 |
| | EOCN-104S | — | — | 50 | — | — | 25 |
| | NC-3000 | — | — | — | 50 | — | — |
| (a2) | KDS-8170 | 15 | — | — | 15 | 15 | — |
| | CEL2021P | — | 15 | — | — | — | 15 |
| | RE-310S | — | — | 15 | — | — | — |
| (a3) | EP0408 | 10 | — | — | 10 | 10 | — |
| | EP0409 | — | 10 | — | — | — | 10 |
| | KHE-8000H | — | — | 10 | — | — | — |
| (B) | Prep. Ex. 1 | 50 | — | 20 | 20 | 40 | — |
| | Prep. Ex. 2 | — | 50 | — | — | — | 40 |
| (C) | GPH-65 | 30 | — | — | — | 30 | — |
| | KA-1160 | — | 30 | — | — | — | 30 |
| | KH-6021 | — | — | 30 | — | — | — |
| | KPH-F3075 | — | — | — | 30 | — | — |
| (D) | YA050C | 95 | — | — | 90 | 65 | 90 |
| | YC100C | — | 120 | — | — | — | 30 |
| | SC2050 | — | — | 95 | 30 | 30 | 30 |
| (E) | C11Z-CNS | 2 | — | — | 2 | 2 | — |
| | 2PZ | — | 2 | 2 | — | — | 2 |

TABLE 2

| | Weight (g) | Example 7 | Example 8 | Example 9 | Example 10 | Example 11 | Example 12 |
|---|---|---|---|---|---|---|---|
| (a1) | EPPN-201L | — | — | 80 | — | — | — |
| | NC-2000L | — | — | — | 30 | — | — |
| | EOCN-104S | 25 | — | — | — | 20 | — |
| | NC-3000 | 25 | 50 | — | — | — | 20 |
| (a2) | KDS-8170 | — | 15 | 15 | — | — | — |
| | CEL2021P | — | — | — | 10 | — | — |
| | RE-310S | 15 | — | — | — | 10 | 60 |
| (a3) | EP0408 | — | 10 | 3 | 70 | — | — |
| | EP0409 | — | — | — | — | 70 | — |
| | KHE-8000H | 10 | — | — | — | — | 10 |
| (B) | Prep. Ex. 1 | 20 | 20 | — | — | 20 | — |
| | Prep. Ex. 2 | — | — | 40 | 40 | — | 40 |
| (C) | GPH-65 | — | — | 30 | — | — | — |
| | KA-1160 | — | — | — | 30 | — | — |
| | KH-6021 | 30 | — | — | — | 30 | — |
| | KPH-F3075 | — | 30 | — | — | — | 30 |
| (D) | YA050C | 65 | 90 | 95 | 120 | 50 | 50 |
| | YC100C | — | — | — | — | — | — |
| | SC2050 | 30 | 30 | — | — | 50 | 50 |
| (E) | C11Z-CNS | — | 2 | 2 | 2 | — | — |
| | 2PZ | 2 | — | — | — | 2 | 2 |

TABLE 3

| | Weight (g) | Comp. Example 1 | Comp. Example 2 | Comp. Example 3 | Comp. Example 4 | Comp. Example 5 |
|---|---|---|---|---|---|---|
| (a1) | EPPN-201L | 55 | — | — | — | 80 |
| | NC-2000L | — | 20 | — | — | — |
| | EOCN-104S | — | — | 10 | — | — |
| | NC-3000 | — | — | — | 8 | — |
| (a2) | KDS-8170 | 14 | — | — | — | — |
| | CEL2021P | — | 5 | — | — | 5 |
| | RE-310S | — | — | 5 | 10 | — |
| (a3) | EP0408 | 2 | 80 | — | — | — |
| | EP0409 | — | — | 80 | — | — |
| | KHE-8000H | — | — | — | 75 | 5 |
| (B) | Prep. Ex. 1 | — | 20 | 20 | 20 | — |
| | Prep. Ex. 2 | 40 | — | — | — | 50 |
| (C) | GPH-65 | 30 | — | — | — | — |
| | KA-1160 | — | 30 | — | — | — |
| | KH-6021 | — | — | 30 | — | 30 |
| | KPH-F3075 | — | — | — | 30 | — |
| (D) | YA050C | 95 | 120 | 50 | 50 | 120 |
| | YC100C | — | — | — | — | — |
| | SC2050 | — | — | 50 | 50 | 30 |
| (E) | C11Z-CNS | 2 | 2 | — | — | — |
| | 2PZ | — | — | 2 | 2 | 2 |

The components listed in Tables 1 to 3 are as follows.
(a1) organic solid epoxy resin; (a2) organic liquid epoxy resin; (a3) organic-inorganic hybrid epoxy resin; (B) thermoplastic resin; (C) curing agent; (D) inorganic filler; (E) curing catalyst EPPN-201L: solid epoxy resin (Nippon Kayaku, epoxy equivalent weight of 190 g/eq.)

NC-2000L: solid epoxy resin (Nippon Kayaku, epoxy equivalent weight of 237 g/eq.)

EOCN-104S: solid epoxy resin (Nippon Kayaku, epoxy equivalent weight of 218 g/eq.)

NC-3000: solid epoxy resin (Nippon Kayaku, epoxy equivalent weight of 275 g/eq.)

KDS-8170: liquid epoxy resin (Kukdo Chemical, epoxy equivalent weight of 157 g/eq.)

CEL2021P: liquid epoxy resin (DAICEL, epoxy equivalent weight of 130 g/eq.)

RE-310S: liquid epoxy resin (Nippon Kayaku, epoxy equivalent weight of 180 g/eq.)

EP0408: organic-inorganic hybrid epoxy resin having a repeating unit of Chemical Formula 1 (epoxy equivalent weight of 177 g/eq., epoxycyclohexyl POSS, $(C_8H_{13}O)_n(SiO_{1.5})_n$, viscosity of 500 Pa·s, hybrid plastics)

EP0409: organic-inorganic hybrid epoxy resin having a repeating unit of Chemical Formula 1 (epoxy equivalent weight of 167 g/eq., glycidyl POSS, $(C_6H_{11}O_2)_n$ $(SiO_{1.5})_n$, viscosity of 48 Pa·s, hybrid plastics)

KHE-8000H: organic-inorganic hybrid epoxy resin having a repeating unit of Chemical Formula 1 (epoxy equivalent weight of 174 g/eq., yellow liquid (colorless~pale), viscosity of 1.9 Pa·s, estimated molecular weight of 696 g/mol when n=1, estimated molecular weight of R with epoxy group of 122 g/mol, Nippon Kayaku)

GPH-65: phenolic resin (Nippon Kayaku, hydroxyl equivalent weight of 198 g/eq, softening point of 65° C.)

KA-1160: phenolic resin (DIC, hydroxyl equivalent weight of 117 g/eq, softening point of 86° C.)

KH-6021: phenolic resin (DIC, hydroxyl equivalent weight of 121 g/eq, softening point of 133° C.)

KPH-F3075: phenolic resin (Kolon Chemical, hydroxyl equivalent weight of 175 g/eq., softening point of 75° C.)

YA050C: filler (Admatech, spherical silica, average particle diameter of about 50 nm)

YC100C: filler (Admatech, spherical silica, average particle diameter of about 100 nm)

SC2050: filler (Admatech, spherical silica, average particle diameter of about 400 nm)

C11Z-CNS: imidazole curing agent (Curezol C11Z-CNS, SHIKOKU)

2PZ: imidazole curing agent (Curezol 2PZ, SHIKOKU)

Experimental Examples

The following tests were performed on the adhesive composition, the adhesive film, or the semiconductor device according to Examples and Comparative Examples, and the results are shown in Tables 4 to 6 below.

(1) Measurement of Melt Viscosity

The adhesive layer obtained in each of Examples and Comparative Examples was stacked until the thickness became 320 μm, and then laminated using a roll laminator at 60° C. After each specimen was formed into a circular shape with a diameter of 25 mm, the lowest viscosity value measured at a rate of 10° C./min with a shear rate of 10 Hz using Anton Paar's MCR302 was defined as the melt viscosity.

(2) Evaluation of Fillet

For each of the semiconductor devices obtained in Examples and Comparative Examples, the longest length of the adhesive composition spreading out around the semiconductor element was measured. The length of 300 μm or less was evaluated as pass (O) of fillet properties, and the length of greater than 300 μm was evaluated as failure (X) of fillet properties.

(3) Evaluation of Voids

For each of the semiconductor devices obtained in Examples and Comparative Examples, when the area occupied by voids between the bump chip and the substrate chip by Scanning Acousitic Tomography (SAT) was 1% or less, it was evaluated as pass (O). When exceeding 1%, it was evaluated as failure (X).

(4) Evaluation of Reliability of Conduction

For each of the semiconductor devices obtained in Examples and Comparative Examples, it was evaluated as pass (O) when daisy chain connection could be confirmed, and failure (X) when daisy chain connection could not be confirmed.

(5) Evaluation of Connection

For each of the semiconductor devices obtained in Examples and Comparative Examples, the connection part was exposed by single-side polishing and observed with an optical microscope. When the adhesive composition was not trapped at the connection part and solder was sufficiently wet in the wiring, it was evaluated as pass (O). And the other was evaluated as failure (X).

(6) Evaluation of Wafer Warpage

The 20 μm thick adhesive layer obtained in one of Examples and Comparative Examples was laminated on a mirror wafer of 8 inches in diameter and 150 μm in thickness, and cured in an oven at 240° C. for 1 hour. Thereafter, the height of edges was measured at room temperature. The height of 2 mm or less was evaluated as pass (O), and the height of greater than 2 mm was evaluated as failure (X).

(7) Evaluation of Reliability (Thermal Cycle Test)

For each of the semiconductor devices obtained in Examples and Comparative Examples, 10 devices were prepared and treated under a thermal cycle tester condition of −65° C. to 150° C. at the lowest and highest temperatures for 45 minutes each. Thereafter, whether peeling occurred was evaluated by Scanning Acousitic Tomography (SAT). After 500 cycles, when all 10 devices had no peeling, it was evaluated as pass (0), and at least one peeling was evaluated as failure (X).

TABLE 4

|  | Example 1 | Example 2 | Example 3 | Example 4 | Example 5 | Example 6 |
|---|---|---|---|---|---|---|
| Melt viscosity (Pa · s) | 3200 | 4400 | 1950 | 2600 | 2800 | 3900 |
| Fillet | 0 | 0 | 0 | 0 | 0 | 0 |
| Voids | 0 | 0 | 0 | 0 | 0 | 0 |
| Conduction | 0 | 0 | 0 | 0 | 0 | 0 |
| Connection | 0 | 0 | 0 | 0 | 0 | 0 |
| Wafer warpage | 0 | 0 | 0 | 0 | 0 | 0 |
| Reliability | 0 | 0 | 0 | 0 | 0 | 0 |

TABLE 5

|  | Example 7 | Example 8 | Example 9 | Example 10 | Example 11 | Example 12 |
|---|---|---|---|---|---|---|
| Melt viscosity (Pa · s) | 2000 | 2500 | 3100 | 2700 | 900 | 2800 |
| Fillet | 0 | 0 | 0 | 0 | 0 | 0 |
| Voids | 0 | 0 | 0 | 0 | 0 | 0 |
| Conduction | 0 | 0 | 0 | 0 | 0 | 0 |
| Connection | 0 | 0 | 0 | 0 | 0 | 0 |
| Wafer warpage | 0 | 0 | 0 | 0 | 0 | 0 |
| Reliability | 0 | 0 | 0 | 0 | 0 | 0 |

TABLE 6

|  | Comp. Example 1 | Comp. Example 2 | Comp. Example 3 | Comp. Example 4 | Comp. Example 5 |
|---|---|---|---|---|---|
| Melt viscosity (Pa · s) | 3400 | 200 | 300 | 320 | 7200 |
| Fillet | O | X | X | X | O |
| Voids | O | X | X | X | X |
| Conduction | O | O | O | O | X |
| Connection | O | X | X | X | X |
| Wafer warpage | X | O | O | O | X |
| Reliability | X | X | X | X | X |

Referring to Tables 4 and 5, it was confirmed that the adhesive compositions according to Examples 1 to 12 could exhibit excellent adhesive strength during thermal compression bonding of a semiconductor circuit while minimizing a warpage of wafer caused by stacking of semiconductor circuits.

On the other hand, referring to Table 6, the adhesive compositions according to Comparative Examples 1 to 5 had poor fillet properties or caused voids defects and poor connection. In particular, all of the adhesive compositions according to Comparative Examples 1 to 5 failed the thermal cycle test.

The invention claimed is:

1. An adhesive composition for semiconductor circuit connection, comprising a thermosetting resin containing an organic epoxy resin and an organic-inorganic hybrid epoxy resin having a repeating unit represented by Chemical Formula 1, wherein a weight ratio of the organic epoxy resin to the organic-inorganic hybrid epoxy resin having a repeating unit represented by Chemical Formula 1 in the thermosetting resin is the range of 1:0.03 to 1:4.0,
wherein the organic epoxy resin contains (a1) an organic epoxy resin that is solid at 10 to 35° C., and (a2) an organic epoxy resin that is liquid at 10 to 35° C.,
wherein
a weight ratio of (a1):[(a2)+(a3)] is 1:0.15 to 1:2.7, and
a weight ratio of (a2):(a3) is 1:0.15 to 1:10,
wherein (a3) is the organic-inorganic hybrid epoxy resin,
wherein the adhesive composition further comprises a thermoplastic resin, a curing agent, an inorganic filler, and a curing catalyst,
wherein the thermoplastic resin is a (meth)acrylate-based resin having a (meth)acrylate-based repeating unit containing an epoxy-based functional group,
wherein the thermoplastic resin is included in an amount of 53 parts by weight to 70 parts by weight, the curing agent is included in an amount of 10 parts by weight to 150 parts by weight, the inorganic filler is included in an amount of 5 parts by weight to 200 parts by weight, and the curing agent catalyst is included in an amount of 0.1 to 20 parts by weight, based on 100 parts by weight of the thermosetting resin, and
wherein the organic-inorganic hybrid epoxy resin has an average epoxy equivalent weight of 50 g/eq. to 174 g/eq.:

[Chemical Formula 1]

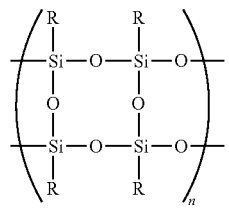

in the Chemical Formula 1,
R is each independently a monovalent functional group having at least one epoxy group, and
n is 1 to 30.

2. The adhesive composition for semiconductor circuit connection of claim 1,
wherein R of the Chemical Formula 1 is each independently a functional group selected from the group consisting of the following structural formulae:

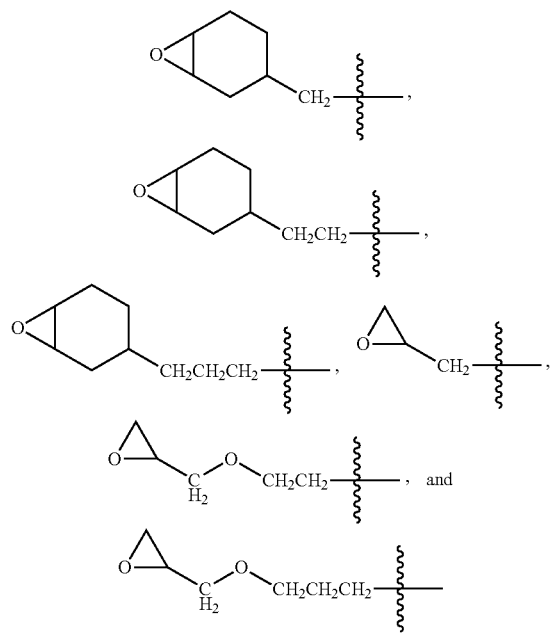

in the above structural formulae,

represents a site where the corresponding functional group is connected to Si.

3. The adhesive composition for semiconductor circuit connection of claim 1,
wherein the organic-inorganic hybrid epoxy resin has a viscosity of 0.1 Pa·s to 10000 Pa·s as measured at 25° C.

4. The adhesive composition for semiconductor circuit connection of claim 1,
wherein the organic epoxy resin is at least one resin selected from the group consisting of a bisphenol-based epoxy resin, a biphenyl-based epoxy resin, a naphthalene-based epoxy resin, a fluorene-based epoxy resin, a phenol novolac-based epoxy resin, a cresol novolac-based epoxy resin, a xylok-based epoxy resin, a tris-hydroxyphenylmethane-based epoxy resin, a tetraphenylmethane-based epoxy resin, a dicyclopentadiene-type epoxy resin, and a dicyclopentadiene-modified phenol-type epoxy resin.

5. The adhesive composition for semiconductor circuit connection of claim 1, wherein the curing agent is at least one compound selected from the group consisting of an amine-based curing agent, a phenol-based curing agent, and an acid anhydride-based curing agent.

6. The adhesive composition for semiconductor circuit connection of claim 1, wherein the inorganic filler is at least one inorganic particle selected from the group consisting of alumina, silica, barium sulfate, magnesium hydroxide, magnesium carbonate, magnesium silicate, magnesium oxide, calcium silicate, calcium carbonate, calcium oxide, aluminum hydroxide, aluminum nitride, and aluminum borate.

7. The adhesive composition for semiconductor circuit connection of claim 1, wherein the curing catalyst is at least one compound selected from the group consisting of a phosphorus-based compound, a boron-based compound, a phosphorous-boron-based compound, and an imidazole-based compound.

8. An adhesive film containing the adhesive composition for semiconductor circuit connection of claim 1.

* * * * *